United States Patent
Limbach

[11] 3,897,937
[45] Aug. 5, 1975

[54] EXTRUDER SCREW

[76] Inventor: A. Paul Limbach, 11 Woodmont Dr., Downington, Pa. 19335

[22] Filed: Aug. 30, 1973

[21] Appl. No.: 393,118

[52] U.S. Cl. .................. 259/191; 259/9; 415/72
[51] Int. Cl.² ................................. B29B 1/10
[58] Field of Search ............ 259/9, 10, 25, 26, 45, 259/46, 68, 69, 109, 110, 191, 192, 193, 97; 425/207, 208; 415/72

[56] References Cited
UNITED STATES PATENTS

| | | | |
|---|---|---|---|
| 3,405,847 | 10/1968 | Jacobey | 198/213 |
| 3,595,627 | 7/1971 | Abbott | 259/10 |
| 3,727,892 | 4/1973 | Notte | 259/10 |

Primary Examiner—Harvey C. Hornsby
Assistant Examiner—James A. Niegowski
Attorney, Agent, or Firm—Caesar, Rivise, Bernstein & Cohen

[57] ABSTRACT

For use in plastic extrusion apparatus, an extrusion screw having a central root. The central root has a cylindrical surface of a predetermined radius and about which surface a helical thread is disposed to form a plurality of flights. The radius of the surface of the flights is slightly greater than the radius of the central root. The root of at least one flight includes plural depressed portions, each of which is in the form of a planar surface, whose maximum distance from the central axis of the root is less than the radius of the central root. Adjacent depressed portions in the flight are separated from one another by the cylindrical surface of the root.

10 Claims, 6 Drawing Figures

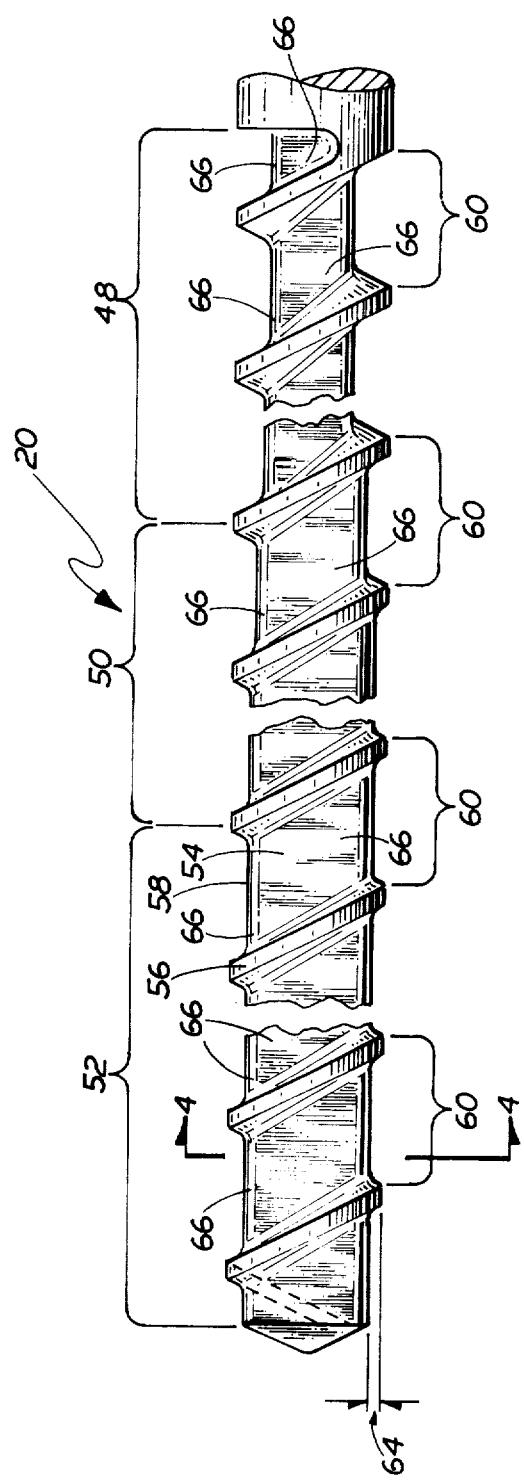
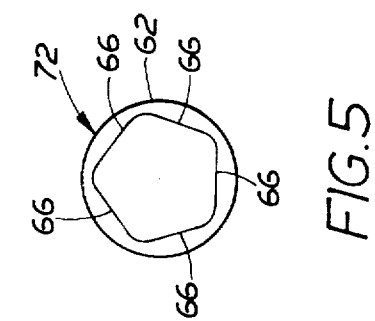
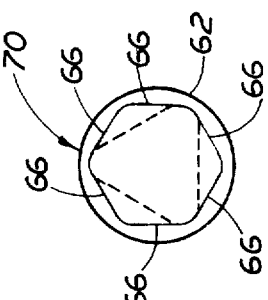
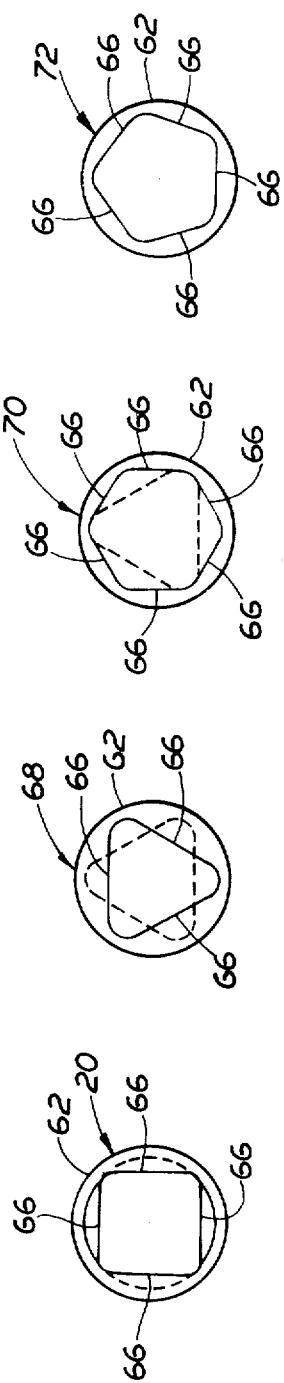

EXTRUDER SCREW

This invention relates generally to apparatus for advancing and mixing plastic material and more particularly to extrusion screws for use in plastic extrusion apparatus.

It is a general practice to mix and homogenize polymers by advancing a stream of plastic material through apparatus, commonly called extrusion apparatus, by means of a helical screw, commonly called an extrusion screw. Prior art extrusion screws are generally elongated members having a central core or root which is cylindrical, with a helical thread disposed about the root. Each complete revolution of the thread about the root is denoted as a flight and the top surface of the flight is known as a flight land. The radial distance between the flight land and the surface of the root is known as the flight depth.

Extrusion screws commonly comprise three longitudinally disposed sections, namely, a feed section, a transition section and a metering section. In the feed section, the root diameter in each flight is constant and is the smallest radius in the screw. The feed section is adapted to draw the material to be mixed into the apparatus. The transition section immediately follows the feed section and is characterized in that the root radius increases uniformly with each succeeding flight. The transition section serves to carry the material from the feed section to the metering section which is disposed immediately thereafter and wherein the primary mixing action occurs. The root radius in the metering section is constant and is the maximum radius of the screw to provide the shallow metering flight depth necessary to effectuate proper mixing.

Heretofore, various single extrusion screws have been proposed and are commercially available, yet such prior art screws have not been entirely successful, particularly in the mixing and the low temperature extrusion of plastic polymers. In order to achieve sufficient mixing by a single screw extrusion apparatus, the flight depth of its screw is commonly made relatively small to increase the shear force and thus expedite the mixing action. However, it has been found that the increasing of the shear force by the reduction of the flight depth concomitantly results in the production of excess heat during the extrusion process, which heat is objectionable in various applications.

As an alternative to the flight depth reduction approach, it is a common practice to provide a screw with mixing stages including pins, fluted sections, etc. to break up the plastic flow. However, such techniques produce the requisite mixing for only a very short portion of the screw.

Another approach is to utilize a screw having a pair of threads defining a pair of channels. The plastic flows from one channel to the next over the flight land and this action results in the production of high shear forces without objectionable excess heating. While such a technique offers mixing advantages, the screw utilized is extremely expensive to manufacture.

It is a general object of this invention to provide a novel extruder screw which overcomes many of the disadvantages of the prior art.

It is a further object of this invention to provide a simple and inexpensive extruder screw which effects the efficient mixing of plastic material without the production of excess heat.

It is still a further object of this invention to provide an extruder screw which serves to dampen pressure pulsations which may result during the extrusion process.

The foregoing as well as other objects of this invention are achieved by providing an elongated extrusion screw having a central axis and comprising a central root. The central root has a cylindrical surface of a first predetermined radius and a helical thread disposed about the surface along the length thereof to form at least one flight. The flight includes a land of a second predetermined radius. The second radius is slightly greater in dimension than the first radius. The root includes at least one portion in at least one flight defining a depressed surface whose maximum distance from the central axis in the radial direction is less than the dimension of the first radius. The remaining portion of the flight has the cylindrical surface of the first predetermined radius.

Other objects and many of the attendant advantages of this invention will become readily apparent by reference to the following description when considered in connection with the accompanying drawings wherein:

FIG. 2 is an enlarged side elevational view of the screw shown in FIG. 1;

FIG. 3 is a sectional view similar to that of FIG. 3 but showing an alternative embodiment of the invention;

FIG. 4 is a sectional view taken along lines 4—4 of FIG. 2;

FIG. 5 is a sectional view, like that of FIGS. 3 and 4, but showing yet another embodiment of the invention; and FIG. 6 is a sectional view, like that of FIGS. 3, 4 and 5, but showing still another embodiment of the invention.

Figure 1:
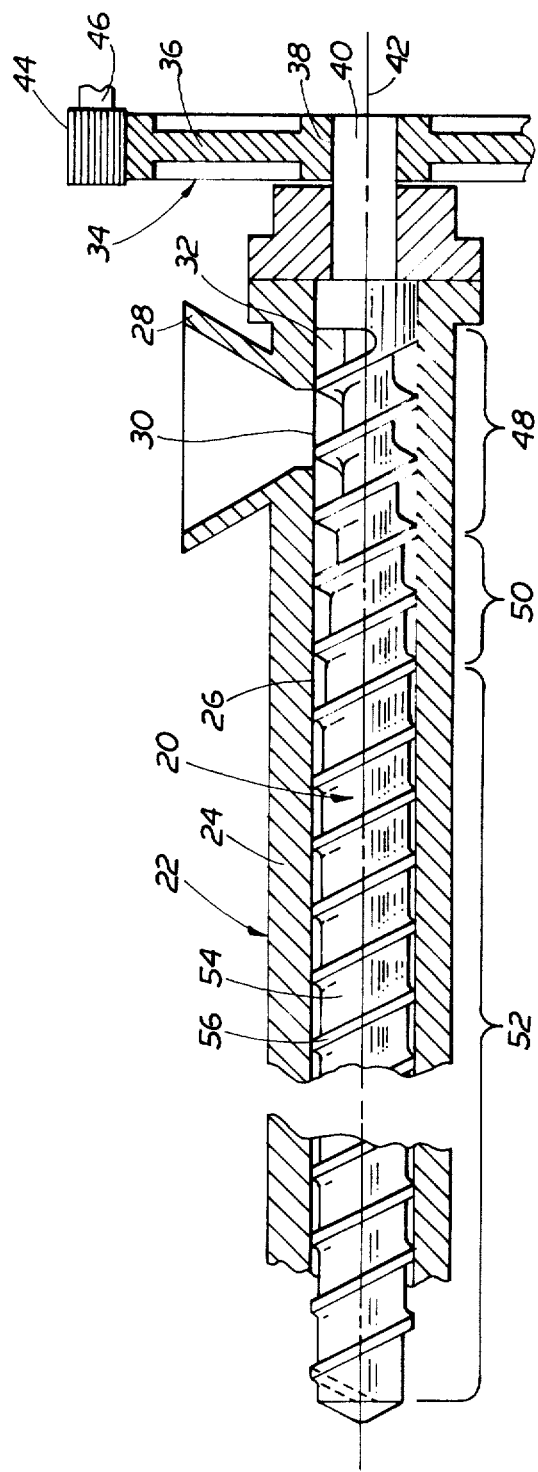
FIG. 1 is a sectional view of a typical extrusion apparatus utilizing an extrusion screw in accordance with this invention.

Referring now in greater detail to the various figures of the drawing wherein like reference characters refer to like parts, there is shown at 20 in FIG. 2 an extruder screw embodying the present invention. The screw 20 is adapted to be used in apparatus 22 (FIG. 1) for the extrusion of plastic polymers.

As can be seen in FIG. 1, the extrusion apparatus 22, less screw 20, is of the conventional configuration and basically comprises a cylinder or casing 24 having an elongated cylindrical bore 26 in communication with a material feed hopper 28 by means of an inlet opening 30 disposed at one end 32 thereof. An outlet opening (not shown) is provided at the other end of the bore 26. An extruder die (not shown) is mounted over the outlet opening of the casing.

The screw 20 is mounted within the bore 26 and is adapted to be rotated therein by a power drive assembly 34. The power drive assembly includes a main drive gear 36 having a central opening 38 in which one end 40, hereinafter called the power end, of the screw 20 is fixedly mounted. The drive gear 36 is rotated about its central axis to effect the rotation of the screw about its longitudinal axis 42 by means of a power gear 44. The power gear 44 is connected directly to a rotating shaft 46 of a motor (not shown), but alternatively may be coupled through other gear means to the motor's shaft. In any event, it is the motor which provides the motive force to cause the rotation of the extruder screw 20.

As is conventional, the bore 26 includes three separate and longitudinal aligned zones or sections which, as will be considered later, are established by associated zones of the extruder screw. The first zone, is denoted by the reference numeral 48 and is the feeding zone, the zone at which the plastic material enters the bore 26 from the feed hopper 28. Immediately succeeding the feeding zone 48 is a transition zone, which is denoted by the reference numeral 50, and wherein the plastic material is carried from the feeding zone 48 to the metering or plasticization zone, which latter zone is denoted by the reference numeral 52. It is in the metering zone that substantially all of the homogenization and plasticizing of the plastic polymer occurs.

As can be seen in FIG. 2, the screw 20 is an elongated member and basically comprises a cylindrical core or root 54 having a helical thread 56 disposed along the surface 58 thereof to form a plurality of flights 60. The top surface of the thread or flight land is denoted by the reference numeral 62. The radius of the flight land 62 along the entire length of the screw is constant and is the same as the radius of the bore 26 such that when the screw is positioned within the bore 26, like that shown in FIG. 1, the flight land abuts the inner surface of the bore. The radial distance between the cylindrical surface 58 of the root 54 and the flight land 62 is referred to as the normal flight depth 64. The radius of the cylindrical surface of the root in any flight is hereinafter referred to as the root radius and the root in a flight is referred to as the flight root.

As is conventional, the root radius of the flight root in the first few flights of the screw adjacent the power end is substantially smaller than the radius of the land 62 to provide a relatively deep flight depth 64. A deep flight depth expedites the entrance of the plastic material (not shown) into the bore. Accordingly, it is the first few flights of the screw that define the feed zone 48.

The next few successive flights of the screw define the transition zone 50. To that end, as is conventional, the root radius in each of the succeeding flight roots, starting with the flight root closest to the feeding zone, increases constantly. In so doing, the flight depth 64 decreases with each flight in the direction towards the metering zone 52.

As is conventional, the root radius in each flight in the metering zone is constant and is only slightly smaller than the radius of the flight land, whereupon a relatively shallow flight depth results. The shallow flight depth is known as the metering flight depth and is effective to ensure that sufficient shear is produced in the plastic material as it moves between the flight roots and the inside surface of the casing in the metering zone.

In accordance with one aspect of this invention, the portions of the surface of the flight roots in various flights of the screw 20 are depressed to provide a greater space between the inside surface of the bore 26 and the depressed surface. It should be pointed out at this juncture that the use of the term "depressed surface" in accordance with this invention means that the radial distance from the axis of the root to the highest point on the surface thereof is less than the root radius. Accordingly, the depressed surface may be convex, planar, concave or even irregular, so long as the distance from the screw axis to the highest point on the surface is less than the root radius.

The depressed surface portions are provided to change the mixing pattern of the screw and to that end, they provide a high pumping action with low shear. In order to ensure that there is sufficient shear to shear the product to a controlled quality, i.e effect the proper mixture and plasticization of the plastic polymer, the root in each flight having a depressed surface also includes some portion having a cylindrical surface whose radius is the "root radius." Accordingly, each flight includes a portion wherein the space between the flight root and the inside surface of the bore is the normal flight depth.

As will be considered in detail hereinafter, in accordance with a preferred embodiment of the invention, the depressed surfaces are flatted or planar surfaces 66.

As can be seen in the elevational view of FIG. 2 and the sectional view of FIG. 4, the flight roots in each of the flights 60 forming the metering zone 52 are provided with four flatted surfaces, 66. Each surface is of approximately the same area and the four surfaces are disposed normal to one another such that the cross section of the flight root is of a general square shape.

As previously noted and in order to provide the screw with portions which will produce high shear in the plastic as it is mixed, it is necessary that the portions of the flight root between the flatted surfaces 60 be cylindrical surfaces whose radius is the root radius. To that end, the plural flatted sections in each flight root may be formed by grinding or milling away portions of the root, while leaving untouched cylindrical surface portions therebetween. Accordingly, the corners of the flight root's generally "square" cross section are rounded, with their radius being the root radius.

In FIG. 3 there is shown a sectional view of another screw 68 in accordance with this invention. As can be seen therein, screw 68 includes three equally spaced flatted surfaces 66 in its flight roots, and thus in cross section the flight root has a generally triangular shape, with rounded corners whose radius is the root radius.

In FIG. 5 there is shown a sectional view of still another screw 70 in accordance with this invention. As can be seen therein, screw 70 includes five equally spaced flatted surfaces 66 in its flight roots, and thus in cross section, the flight root has a generally pentagon shape, with rounded corners whose radius is the root radius.

In FIG. 6 there is shown a sectional view of yet another screw 72 in accordance with this invention. As can be seen therein, screw 72 includes six equally spaced flatted surfaces 66 in its flight roots, and thus in cross section, the flight root has a generally hexagon shape, with rounded corners whose radius is the root radius.

Operation of the apparatus 22 is as follows: Plastic polymer material, such as in the form of chips, pellets or the like, is provided into the feed hopper 28 from whence the pellets pass through opening 30 to the interior of casing 24. The motor (not shown) is then energized to cause the rotation of the screw within the casing 24, via the interposed power drive assembly 34. This action causes the screw to rotate about its axis 42 and draws the nuggets into the feed zone 48 in the bore 26. The flight depth of the screw 20 is rather deep in the feed zone such that a large amount of material is drawn in. The rotating helical thread 56 of the screw pushes the material in a corkscrew fashion through the flights and down the casing to the transition zone 50, wherein the material passes in a corkscrew fashion from flight to flight through an ever decreasing space between the root and the bore's inner surface until the material is carried to the metering zone 52. In the metering zone, the flight depth between the adjacent flatted surfaces 66 in each flight is the shallow, normal metering flight depth. Accordingly, high shear results in the material as it moves from one flatted surface to immediately succeeding flatted surface over the interposed cylindrical surface of the flight root. However, due to the relatively large space between the inside surface of the bore 26 and the flatted surface 66 of the flight root, low shear exists at this point and excess heat does not result. The flatted surfaces also serve to dampen any presssure pulsations which may result from the collapsing of the pellets as they melt.

The plastic material continues to move down the casing in a corkscrew fashion and over all of the flatted and interposed cylindrical surfaces, which effects the complete homogenization and plasticization of the material. The resulting homogenized material then passes out through the extruder die for collection.

It should be pointed out while the flatted areas in the flight roots are of particular utility in the metering zone 52 of the screw 20, such areas are also of some utility in the transition and feed zones as well and thus the screw shown in FIG. 2 includes flatted areas in its transition and feed zones.

It should also be pointed out that not all of the flight roots in any particular zone have to include depressed areas, and in that regard, some flight roots may be completely cylindrical. Further still, it should be noted that some flight roots in any particular zone may include more depressed surfaces than other flight roots therein.

As should now be appreciated by those skilled in the art, the extruder screw of the instant invention, by providing depressed surfaces in various flight roots, enables plastic polymers to be mixed and extruded to provide a controlled quality mass, without the need for complex and expensive equipment and without the dangers of excessive heat build up.

Without further elaboration, the foregoing will so fully illustrate my invention that others may, by applying current or future knowledge, readily adapt the same for use under various conditions of service.

What is claimed as the invention is:

1. An elongated extrusion screw having a central axis and comprising a central root having a round cylindrical surface of a first predetermined radius and having a helical thread disposed about said surface along a length thereof to form at least one flight, said flight having a land of a second predetermined radius, said root including at least one portion in at least one flight lying adjacent said land and defing a planar depressed surface whose maximum distance from the central axis in the radial direction is less than the dimension of the first radius, the remaining portion of the root of said flight also lying adjacent said land and having said round cylindrical surface of said first predetermined radius.

2. The extrusion screw of claim 1 wherein said flight includes plural portions, each one defining a planar depressed surface whose maximum distance from the central axis in the radial direction is less than the dimension of the first radius, with a portion of said cylindrical surface interposed between adjacent depressed surface portions.

3. The extrusion screw of claim 2 wherein each flight includes three depressed portions such that the cross section of the root is of generally triangular shape with the corners thereof rounded and having said first predetermined radius.

4. The extrusion screw of claim 2 wherein each flight includes four depressed portions such that the cross section of the root is of generally square shape with the corners thereof rounded and having said first predetermined radius.

5. The extrusion screw of claim 2 wherein each flight includes five depressed portions such that the cross section of the root is of generally pentagon shape and with the corners thereof rounded and having said first predetermined radius.

6. The extrusion screw of claim 2 wherein each flight includes six depressed portions such that the cross section of the root is of generally hexagon shape and with the corners thereof rounded and having said first predetermined radius.

7. The extrusion screw of claim 2 wherein said screw includes plural flights, each flight including plural depressed portions.

8. The extrusion screw of claim 2 wherein said screw includes a feed section, a transition section and a metering section and with at least one flight of the metering section including at least one depressed surface portion.

9. The extrusion screw of claim 8 wherein said transition section also includes at least one flight having at least one depressed surface.

10. The extrusion screw of claim 9 wherein said feed section also includes at least one flight having at least one depressed surface.

* * * * *